United States Patent [19]

Nelimarkka

[11] 4,231,545
[45] Nov. 4, 1980

[54] HIGH PRESSURE BALL VALVE WITH TIPPING ACTION

[76] Inventor: Juha A. E. Nelimarkka, Marjalahdentie 8, 00930 Helsinki 93, Finland

[21] Appl. No.: 855,335

[22] Filed: Nov. 28, 1977

[30] Foreign Application Priority Data

Dec. 3, 1976 [FI] Finland .................................. 763488

[51] Int. Cl.³ .............................................. F16K 5/06
[52] U.S. Cl. ..................................... 251/161; 251/175; 251/188; 251/315; 251/335 B
[58] Field of Search .................... 251/315, 152, 335 B, 251/160, 175, 161, 188

[56] References Cited

U.S. PATENT DOCUMENTS

| | | | |
|---|---|---|---|
| 2,218,886 | 10/1940 | Krause | 251/335 B |
| 3,473,554 | 10/1969 | King | 251/315 |
| 3,982,727 | 9/1976 | Nelimarkka | 251/315 |

FOREIGN PATENT DOCUMENTS

| | | | |
|---|---|---|---|
| 627866 | 3/1936 | Fed. Rep. of Germany | 251/335 B |
| 924143 | 1/1955 | Fed. Rep. of Germany | 251/335 B |
| 1104872 | 11/1955 | France | 251/315 |
| 29854 | 11/1903 | Switzerland | 251/335 B |
| 823752 | 11/1959 | United Kingdom | 251/335 B |
| 2618515 | 11/1977 | United Kingdom | 251/335 B |
| 586291 | 9/1975 | U.S.S.R. | |

Primary Examiner—William R. Cline
Assistant Examiner—H. Jay Spiegel
Attorney, Agent, or Firm—Cushman, Darby & Cushman

[57] ABSTRACT

A ball valve or the like for high pressure operation having a connection between the actuating stem and the body wall which allows tipping of the ball valve under pressure into tight sealing engagement with the sealing ring at the outlet end of the valve. The actuating stem is sealed to a first ring but has clearance with the valve body, and the ring is attached by a bellows or the like, which in turn is connected to the valve body, so that the stem may tip slightly with respect to the valve body.

5 Claims, 3 Drawing Figures

HIGH PRESSURE BALL VALVE WITH TIPPING ACTION

BACKGROUND AND SUMMARY OF THE INVENTION

The object of this invention is a ball valve comprising a body provided with a flow channel, an essentially ball-shaped or ball-segment shaped closing organ turnably arranged in the valve body, which closing organ on both sides is provided with integral spindles, and which spindles of the closing organ are mounted or fitted on both sides of the closing organ essentially perpendicular to the longitudinal axis of the flow passage, and of which spindles one spindle is brought outside the valve with the aid of a socket provided with a sealing such as box sealing, as well as sealing rings fitted into ring-shaped and transversal grooves made in the valve body preferably on both sides of the closing organ.

The purpose of the invention is to accomplish a valve particularly suited for high pipe pressures, for instance 25 MPa or considerably above that, and if needed suited also for high temperatures, said valve possessing good sealing efficiency but which nevertheless can be regulated by means of a quite small working mechanism.

The main characteristic feature of the valve according to the invention is that that part of the valve-body wall construction which unites the part sealing the actual body portion and the spindle is made bellow-shaped, accordion-like, or plaited and is dimensioned so as to enable the mentioned wall construction to stand the pipe pressure of the valve, but is nevertheless flexible to the extent of permitting tipping known as such of the closing organ caused by the pressure of the pressure medium acting on the closing organ, or being tipped from outside the valve against the sealing ring at the leaving end of the valve, in relation to the mounting point of the spindle situated on the opposite side of the closing and permitting the mentioned movement, at which e.g. when the pipe pressure acting on the closing organ of the valve is exceptionally high, the closing organ can be turned from outside the valve from tipped position towards a position where the spindles are at right angles to the longitudinal axis of the flow passage of the valve, upon which the closing organ can be turned at a lower torque to desired position.

BRIEF DESCRIPTION OF THE DRAWING

The invention is further explained below and in the enclosed drawing, in which.

DETAILED DESCRIPTION OF THE DRAWINGS

Figure 1:
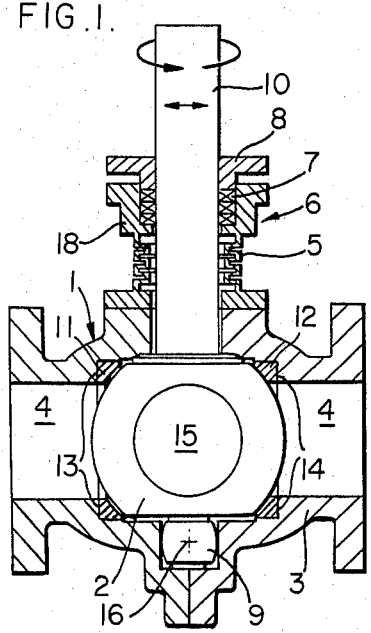
FIG. 1 presents a longitudinal section of a ball valve according to the invention taken at the spindle and the flow passage, in which valve the pipe pressure causes the closing organ to tip against the sealing at the leaving end.
Figure 2:
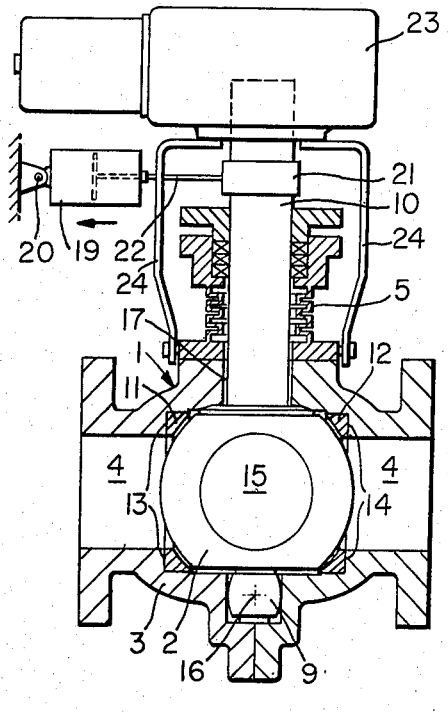
FIG. 2 presents the valve in FIG. 1 equipped with a drive mechanism when the closing organ is inclined to position of regulation.

The valve according to FIGS. 1 and 2 comprises a valve body 1 and a valve closing organ 2 shaped as a ball segment and provided with a bore or a channel 15 of the same diameter as that of the circular flow passage 4 situated in the valve body 1 on both sides of the closing organ 2. In FIGS. 1 and 2 the valve 1 is in closed position and the mentioned bore or channel 15 is situated cross-wise in relation to the flow passage 4.

Joined to the closing organ 2 are integral spindles, one spindle 9 extending downwards and a longer spindle 10 extending upwards. The spindle 9 is mounted in a corresponding hollow in the valve body, and the spindle 10 in a corresponding bore in the upper part of the valve body with the aid of the parts 5,6,7 and 8.

In the body 1 on both sides of the closing organ 2 ring-shaped grooves 13 and 14 running crosswise in relation to the flow passage 4 are fitted preferably with sealing rings 11 and 12 of metal.

In order to enable the pressure difference prevailing in the pipe system when the valve is closed to push the closing organ 2 against the sealing ring 11 or 12 located on the leaving side, the closing organ 2 is able to turn about the point 16 due to the pressure difference, e.g. a little towards the right in FIG. 1.

To this end the circular cross-section of the spindle 9 gets smaller upwards and downwards from center to form a bearing surface of convex shape as shown in the drawing. Around the spindle 10 in the bore of the body portion 3 sufficient clearance 17 exists to permit tipping of the closing organ 2. A plaited ball-shaped wall construction 5 surrounding the spindle 10 is connected to the body portion 3. The ball-shaped wall portion is dimensioned in such way and made of such material, e.g. such metal, that it will stand the pipe pressure but is still able to bend somewhat on account of its bellow-like shape. The term "bellows" as used in the present specification and claims encompasses all accordion-like, plaited, bellows-shaped, and equivalent structures.

A sealing construction 6 for passage of the spindle 10 is joined to the bellows 5 by means of a so-called box sealing. By pressing the encased sealing socket 8 into the body portion 18 of the sealing construction with the aid of bolts, or the like (not shown in the drawing), the sealing 7 situated around the spindle 10 pushes against the spindle 10 and the body portion 18.

Thanks to the construction described above the closing organ 2 and the spindle 10 are able to incline or tip by the action of the pressure difference prevailing in the pipe system, at which the closing organ 2 pushes against the sealing 12 in accordance with FIG. 1.

Tipping may also be done by moving the spindle 10 from its upper part to the right or to the left. In opening the valve the closing organ is turned 90° about its vertical axis or the spindles 9 and 10, at which the bore 15 will have the same direction as the flow passage 4. However, if the closing organ 2 is pressing very hard against the sealing ring 12, e.g. when the pipe pressure acting on the valve is particularly high, the closing organ 2 can be turned from outside the valve by means of the spindle 10 from tipped position or position of pushing against the sealing ring 12, towards a position where the closing organ 2 is free from the sealing 12 or is pushing it by decreased pressure, upon which the closing organ 2 can be turned at a lower torque to desired position.

Figure 3:
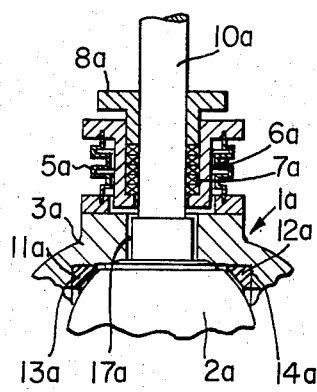
FIG. 3 presents one mode of performance of the invention differing from the foregoing, as a section and a partial projection taken at the plaited point of the valve body and showing the nearby area.

The mode of performance of the invention presented in FIG. 3 essentially concerns a similar valve as FIG. 1. But in FIG. 3 the corresponding parts are marked with the same symbols by adding the letter a. The valve according to FIG. 3 differs, however, from the valve according to FIG. 1 in that the box sealing 6a does not extend upwards from the bellows 5a but downwards into bellows 5a, and therefore has a correspondingly larger diameter.

According to FIG. 2 the valve is provided with a mechanism for opening the valve, and for closing the valve. The mechanism consists of a hydraulic cylinder 19 which is mounted to turn about the fixed point 20. By the hydraulic power the closing organ 2 including spindles can be turned or tipped in relation to the point 16 by means of the piston rod 22 connected to the bearing 21 surrounding the spindle 10.

The actual turning of the closing organ 2 to opened or closed position takes place in quite conventional manner by means of the mechanism 23 which due to the construction of the valve according to the invention has had to be mounted by means of supports 24, flexibly to the body portion 3 in such a way, that the supporting arrangement 24 will allow the mechanism to move along with the spindle 10, when the closing organ 2 is tipped or is tipping, but which supporting arrangement 24 prevents the mechanism 23 from turning in relation to the body portion 3 of the valve. This is accomplished, for instance, by making the supports 24 sufficiently flexible in the tipping direction, or by connecting them for instance by a tap-link joint.

While the invention has been herein shown and described in what is presently conceived to be the most practical and preferred embodiment thereof, will be apparent to those of ordinary skill in the art that many modifications may be made thereof within the scope of the invention, which scope is to be accorded the broadest interpretation of the appended claims so as to encompass all equivalent structures and devices.

I claim:

1. A ball valve comprising a body provided with a flow channel; a generally ball-shaped rigid closing organ; sealing rings fitted into ring-shaped and transverse grooves in the valve body on both sides of said closing organ; a pair of spindles associated with said closing organ and provided extending from opposite sides thereof for receipt by said body and mounting said organ so that the pressure of fluid on said organ tips said organ into sealing engagement against a said sealing ring; and means for actuating said organ to rotate it with respect to said body to effect opening and closing of said flow channel, said means including one of said spindles extending through said body to the exterior thereof through a sealing mechanism; a bellows capable of withstanding pipe pressure while remaining flexible to permit tipping of said closing organ, said bellows operatively connected to said valve body and said sealing mechanism so that low-torque turning of said organ is effected by pivoting said one spindle so that a line through said spindle is transverse to said flow channel and thus said organ is moved out of tipping engagement with a said sealing ring, and subsequent rotation of said one spindle and said organ.

2. A valve as recited in claim 1 wherein said sealing mechanism is completely surrounded by said bellows.

3. A valve as recited in claim 1 wherein said bellows is disposed intermediate said sealing mechanism and said closing organ.

4. A valve as recited in claim 1 further comprising a mechanism for effecting rotation of said one spindle, and flexible supports for operatively mounting said mechanism to said valve body.

5. A valve as recited in claim 4 further comprising a fluid cylinder and piston rod, said piston rod attached to said one spindle and said cylinder pivotally mounted to a stationary support so that said piston and cylinder can effect pivotal movement of said one spindle and said closing organ.

* * * * *